(12) United States Patent
Shiba

(10) Patent No.: US 9,086,868 B2
(45) Date of Patent: Jul. 21, 2015

(54) HUB DEVICE AND SYSTEM USING THE SAME

(71) Applicant: CANON KABUSHIKI KAISHA, Tokyo (JP)

(72) Inventor: Hiroshi Shiba, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 288 days.

(21) Appl. No.: 13/666,448

(22) Filed: Nov. 1, 2012

(65) Prior Publication Data

US 2013/0132758 A1    May 23, 2013

(30) Foreign Application Priority Data

Nov. 18, 2011  (JP) ................................. 2011-252467

(51) Int. Cl.
  *G06F 1/28* (2006.01)
  *G06F 13/40* (2006.01)
  *G06F 1/26* (2006.01)

(52) U.S. Cl.
  CPC *G06F 1/28* (2013.01); *G06F 1/266* (2013.01); *G06F 13/4068* (2013.01)

(58) Field of Classification Search
  CPC ........ G06F 1/266; G06F 13/4068; G06F 1/28
  USPC .......................................... 710/313; 713/340
  See application file for complete search history.

(56) References Cited

U.S. PATENT DOCUMENTS

| 5,938,770 | A | 8/1999 | Kim | |
| 6,064,554 | A * | 5/2000 | Kim | ................................. 361/64 |
| 7,353,408 | B2 * | 4/2008 | Yeh | ................................. 713/300 |
| 2008/0270780 | A1 * | 10/2008 | Lopez et al. | ...................... 713/1 |
| 2010/0146307 | A1 * | 6/2010 | Griffin et al. | .................. 713/300 |
| 2010/0235655 | A1 * | 9/2010 | Tauscher et al. | ............... 713/300 |
| 2010/0288327 | A1 * | 11/2010 | Lisi et al. | ....................... 136/244 |
| 2012/0144213 | A1 * | 6/2012 | Chang et al. | ................... 713/300 |

FOREIGN PATENT DOCUMENTS

| JP | 10-097352 A | 4/1998 |
| JP | 2000-132250 A | 5/2000 |
| JP | 2002-94539 A | 3/2002 |
| JP | 2004-29893 A | 1/2004 |
| JP | 2006-020495 A | 1/2006 |

* cited by examiner

*Primary Examiner* — Thomas Lee
*Assistant Examiner* — Chad Erdman
(74) *Attorney, Agent, or Firm* — Fitzpatrick, Cella, Harper & Scinto

(57) ABSTRACT

The hub device includes a USB hub IC; a voltage converter that converts a source voltage supplied to the Hub device into a source voltage to be supplied to the USB device/devices connected to the plurality of downstream ports, and, in a case that the USB device/devices is/or in an abnormal condition, outputs a signal notifying the abnormal condition; and a plurality of switch units that interrupts a source voltage to the USB device/devices, and outputs an overcurrent detection signal when overcurrent flows into the USB device/devices, wherein the USB hub IC includes a plurality of overcurrent detection terminals into which the overcurrent detection signal from the plurality of switch units is input, and a signal notifying the abnormal condition causes the plurality of overcurrent detection terminals of the USB hub IC to be in an overcurrent detection condition.

11 Claims, 10 Drawing Sheets

FIG. 3B

| | OVERLOAD CONDITION POINT | SWITCH IC-D1 | SWITCH IC-D2 | VOLTAGE CONVERSION SECTION 2 | EXCESSIVE CURRENT DETECTION TERMINAL 1 | EXCESSIVE CURRENT DETECTION TERMINAL 2 | RECOVERY METHOD (AFTER RELEASING OVERLOAD) |
|---|---|---|---|---|---|---|---|
| CONVENTIONAL EXAMPLES | USB DEVICES 1 | OFF | — | — | NOTIFICATION OF PROTECTION OPERATION | — | REMOTE RESET FROM HOST, OR INSERT OR REMOVE USB DEVICE |
| | USB DEVICES 2 | — | OFF | — | — | NOTIFICATION OF PROTECTION OPERATION | REMOTE RESET FROM HOST, OR INSERT OR REMOVE USB DEVICE |
| | WHOLE OF DOWNSTREAM | IC_OFF | IC_OFF | LATCHING STOP | — | — | TURN SYSTEM POWER ON/OFF (IMPOSSIBLE OF AUTOMATIC RECOVERY) |

FIG. 5B

| | OVERLOAD CONDITION POINT | SWITCH IC-D1 | SWITCH IC-D2 | VOLTAGE CONVERSION SECTION 2 | EXCESSIVE CURRENT DETECTION TERMINAL 1 | EXCESSIVE CURRENT DETECTION TERMINAL 2 | RECOVERY METHOD (AFTER RELEASING OVERLOAD) |
|---|---|---|---|---|---|---|---|
| PATTERN 1 | USB DEVICES 1 | OFF | — | — | NOTIFICATION OF PROTECTION OPERATION | — | REMOTE RESET FROM HOST, OR INSERT OR REMOVE USB DEVICE |
| | USB DEVICES 2 | — | OFF | — | — | NOTIFICATION OF PROTECTION OPERATION | REMOTE RESET FROM HOST, OR INSERT OR REMOVE USB DEVICE |
| PATTERN 2 | WHOLE OF DOWNSTREAM | IC_OFF | IC_OFF | LATCHING STOP | NOTIFICATION OF PROTECTION OPERATION | NOTIFICATION OF PROTECTION OPERATION | RESET FROM HOST (POSSIBLE OF AUTOMATIC RECOVERY) |

FIG. 6B

| | OVERLOAD CONDITION POINT | SWITCH IC-D1 | VOLTAGE CONVERSION SECTION 2 | EXCESSIVE CURRENT DETECTION TERMINAL 1 | EXCESSIVE CURRENT DETECTION TERMINAL 2 | RECOVERY METHOD (AFTER RELEASING OVERLOAD) |
|---|---|---|---|---|---|---|
| PATTERN 1 | USB DEVICES 1 | OFF | — | NOTIFICATION OF PROTECTION OPERATION | | REMOTE RESET FROM HOST, OR INSERT OR REMOVE USB DEVICE |
| PATTERN 2 | VOLTAGE CONVERSION SECTION 2 | IC_OFF | LATCHING STOP | NOTIFICATION OF PROTECTION OPERATION | NOTIFICATION OF PROTECTION OPERATION | RESET FROM HOST (POSSIBLE OF AUTOMATIC RECOVERY) |

HUB DEVICE AND SYSTEM USING THE SAME

BACKGROUND OF THE INVENTION

1. Field of the Invention

The present invention relates to a method of notifying a USB host controller when a power source device supplying power to a USB device is abnormally stopped in a system using a hub device for communicating through USB.

2. Description of the Related Art (1) Overview on USB

Universal serial bus (USB) is an interface standard that connects a personal computer (hereinafter abbreviated as PC) to various peripheral devices (hereinafter called USB devices) according to a common specification standard to realize high speed communication. The USB has a good usability; furthermore, a host controller (hereinafter called USB host) is arranged on a PC side, and communication with various USB devices is controlled by a host controller in a centralized manner, thereby allowing an interface configuration on a USB device side to be simplified and inexpensive.

The number of USB ports that a USB host can directly control is limited. Accordingly, a method is adopted that causes a USB hub device to intervene between a USB host and USB devices. In a USB system configuration, sides of a USB host and a USB device are generally called upstream and downstream, respectively. The description of the present invention also adopts these designations.

(2) Power Source Configuration of USB

Methods of supplying a USB device with power include two methods, that is, a bus power that directly supplies power via a power source line (hereinafter called VBUS line) for supplying power to a USB device of a USB host, and a self power that supplies power from an external power source other than the VBUS line. In the case of supplying a USB device with power according to the bus power, it is specified that the maximum consumption current that can be supplied to the downstream is up to 100 mA. In the case of the self power, it is specified that this current is up to 500 mA.

As to the self power, for instance, Japanese Patent Application Laid-Open No. 2002-94539 discloses a proposal of a configuration including a power source circuit having a function equivalent to that of the self power in a product incorporating a USB host without using an external power source. The USB standard requires that the source voltage range at the input end of a USB device should be from +4.75 to +5.25 V. In the case of supplying power from a USB host, a long wiring path to one of a USB hub device and a USB device increases a voltage drop due to wiring impedance. Accordingly, there is a possibility that a limitation may necessarily be imposed on the configuration of a product to meet the USB standard. Supplying power to a USB device by a power source circuit provided in a product as with Japanese Patent Application Laid-Open No. 2002-94539 has a following advantage. That is, a required consumption current that can be preliminarily expected can be supplied; a voltage conversion section that converts a source voltage into +4.75 to +5.25 V and outputs the converted voltage is installed, thereby allowing a configuration of a product meeting the USB standard to be realized.

Japanese Patent Application Laid-Open No. 2004-29893 discloses a proposal of a configuration that turns off a switch to protect a VBUS line and notify a controller when a USB device consuming current beyond expectation is connected in case of a failure. Furthermore, a switch IC that interrupts current in case where overcurrent flows into a VBUS line, and a USB hub IC that includes an enable terminal for on/off operation on the switch IC, and an overcurrent detection terminal for allowing a detection signal to be input when overcurrent in the switch IC is detected have been on the market. Combination thereof realizes a configuration that causes the switch IC to interrupt the VBUS line, activates the overcurrent detection terminal of the USB hub IC and causes the USB hub device to notify the USB host of the overcurrent detection condition, where the downstream is in an overcurrent condition.

Unfortunately, when activation of the protection function is stopped owing to a failure in a voltage conversion section itself that is provided as the self power or when a USB device in an overload condition is connected to a downstream port, a following phenomenon may occur. That is, the protection operation against overcurrent by the switch IC does not necessarily function first, and stopping may be performed by a protection function of the voltage conversion section itself. In such a case, although the USB host can recognize the protection function operation of the switch IC connected to the downstream port, this host cannot recognize a stoppage of the self power voltage conversion section. In this condition, the self power voltage conversion section is stopped. Accordingly, the VBUS power source of the USB device is interrupted. In this case, the original cause is one of a failure of the voltage conversion section and the overload condition of the USB device. However, there is a possibility that the USB host erroneously recognizes that the downstream USB device has forcedly been pulled out by a user.

In the case where the voltage conversion section is stopped owing to a protection function operation, off and on restart of an input power source is typically required for recovery. However, the USB host erroneously recognizes that the voltage conversion section has not been stopped but the USB device has been forcedly pulled out instead. Accordingly, this host does not start an automatic recovery operation. As a result, from the standpoint of a user, the USB device is kept stopped in a hung-up condition, and the USB host cannot perform appropriate processes, thereby degrading usability.

As with the proposal of Japanese Patent Application Laid-Open No. 2004-29893, it can be considered that, in the case where the self power voltage conversion section is stopped, a detection signal is transmitted to the USB host. This case is advantageous if the USB host, the USB hub device and the USB device are on the same substrate. However, in one of the case where the USB host and the USB hub device are connected by a long wiring path and the case of plural steps of USB hub devices, a signal line for transmitting a detection signal to the USB host is required to be provided in addition to a typical USB communication line. As a result, the interface configuration becomes complex, thereby increasing the cost.

SUMMARY OF THE INVENTION

A purpose of the present invention is to allow a USB host to correctly recognize an error condition using an existing interface configuration even when a self power voltage conversion section of a USB hub device is stopped owing to a protection function operation.

Another purpose of the present invention is to provide a hub device for communicating with a USB host controller and a USB device to transmit and receive data through USB, including a USB hub IC including a plurality of downstream ports; a voltage converter that converts a source voltage supplied to the hub device into a source voltage to be supplied to one or more USB device connected to the plurality of downstream ports, and, in a case that the one or more USB device is in an abnormal condition, outputs a signal notifying the abnormal condition to the USB hub IC; and a plurality of switch units that interrupt a source voltage supplied by the voltage converter to the one or more USB device, and output an overcurrent detection signal when overcurrent flows into the one or more USB device, wherein the USB hub IC comprises a plurality of overcurrent detection terminals into which the overcurrent detection signal from the plurality of switch units is input, and a signal notifying the abnormal condition of the voltage converter causes the plurality of overcurrent detection terminals of the USB hub IC to be in an overcurrent detection condition.

A further purpose of the present invention will be apparent with reference to following detailed description of the invention and accompanying drawings.

BRIEF DESCRIPTION OF THE DRAWINGS

FIG. 3B illustrates a condition of each terminal in a protection operation of the USB hub device and a recovery method.

FIG. 5B illustrates a condition of each terminal in a protection operation and a recovery method.

FIG. 6B illustrates a condition of each terminal in a protection operation and a recovery method.

DESCRIPTION OF THE EMBODIMENTS

Preferred embodiments of the present invention will now be described in detail in accordance with the accompanying drawings.

Modes for implementing the present invention will hereinafter be described in detail with reference to embodiments.

Embodiment 1

Typical System of USB Hub Device

Figure 1:
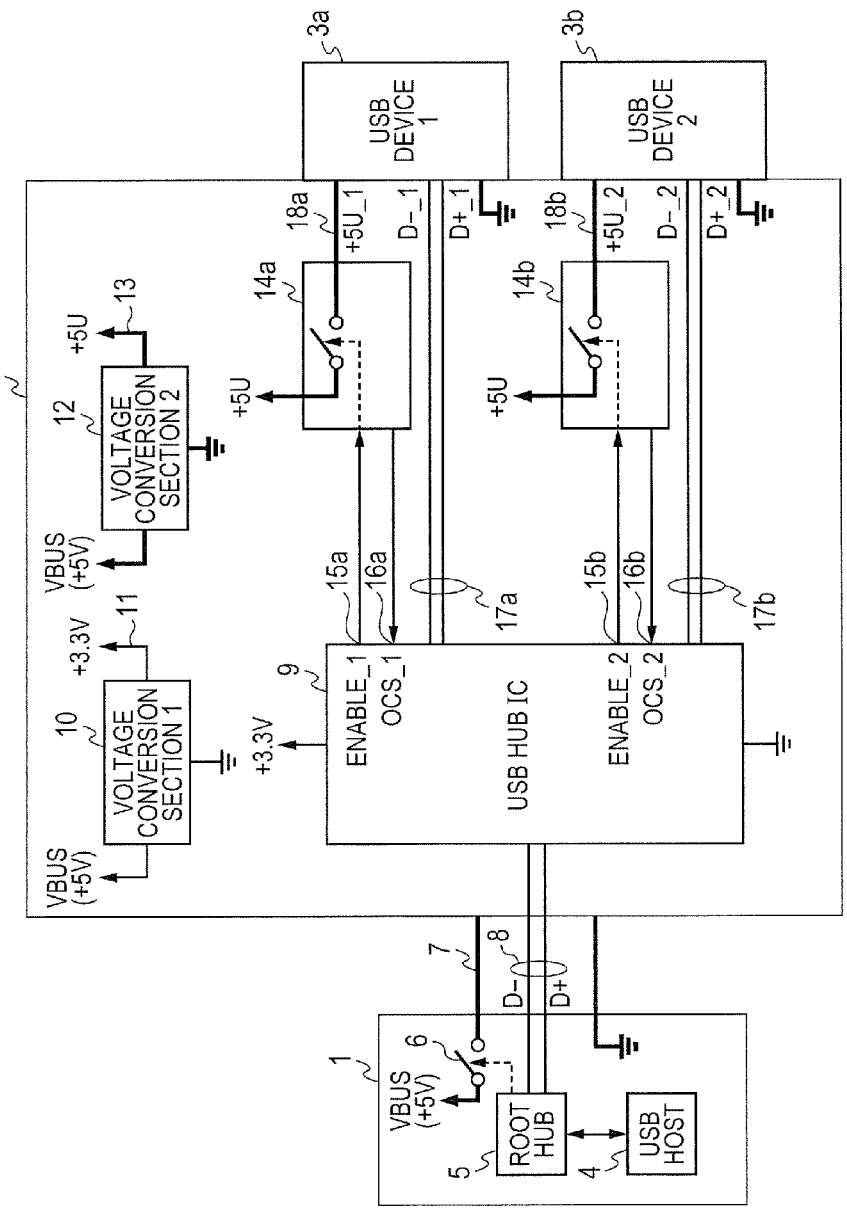
FIG. 1 illustrates a block diagram of a system configuration using a typical USB hub device of Embodiment 1.

First, a typical system using a USB hub device will be described with reference to FIG. 1. This system basically includes a USB host controller device 1, a USB hub device 2, a USB device 1 3a and a USB device 2 3b. Hereinafter, the USB device 1 3a and USB device 2 3b are called a USB device 3 in the case of being collectively called. The USB standard specifies transfer speeds, which are a low speed (LS, 1.5 Mbps), a full speed (FS, 12 Mbps) and a high speed (HS, 480 Mbps). The USB host controller device 1 includes a USB host 4 that is a host controller, and a root hub 5. This device 1 also includes an upstream switch IC-U 6 that is a switch for interrupting a source voltage to be supplied to the USB hub device 2. This device 1 further includes a VBUS (+5 V) power source line 7 that supplies the USB hub device 2 with a source voltage, and upstream data lines (D+, D−) 8. The USB hub device 2 includes a USB hub IC 9, a voltage conversion section 1 10, and a voltage conversion section 2 12. The voltage conversion section 1 10 is supplied with an upstream VBUS voltage (+5 V), and outputs an output voltage 11 of +3.3 V. For instance, the voltage conversion section 1 may be a series regulator. The output voltage of the voltage conversion section 1 10 is mainly supplied to the USB hub IC 9 as a source voltage. For instance, the voltage conversion section 2 12 may be a boost DC/DC converter, which is supplied with an upstream VBUS voltage (+5 V) and generates an output voltage 13 of +5U. The output voltage 13 of +5U is a downstream VBUS voltage adjusted to meet a voltage range of +4.75 V≤+5U_1 and +5U_2≤+5.25 V as the source voltage (after-mentioned +5U_1, +5U_2) for the USB device 3.

A switch IC-D1 14a and a switch IC-D2 14b are respectively connected to an enable terminal 1 15a and an enable terminal 2 15b of the USB hub IC 9 that are for on/off operation on switches between input and output. Hereinafter, the switch IC-D1 14a and the switch IC-D2 14b are called a switch IC-D 14 in the case of being collectively called. In the diagram, the enable terminal 1 15a and the enable terminal 2 15b are denoted by ENABLE_1 and ENABLE_2, respectively. Hereinafter, the enable terminal 1 15a and the enable terminal 2 15b are called an enable terminal 15 in the case of being collectively called. The USB hub IC 9 includes an overcurrent detection terminal 1 (denoted by OCS_1 in the diagram) 16a and an overcurrent detection terminal 2 (denoted by OCS_2 in the diagram) 16b into which signals from the switch IC-D 14 are input. Hereinafter, the overcurrent detection terminal 1 16a and the overcurrent detection terminal 2 16b are called an overcurrent detection terminal 16 in the case of being collectively called. The USB hub IC 9 is connected to the USB device 1 3a and the USB device 2 3b via downstream data lines 1 (D+_1, D−_1) 17a and downstream data lines 2 (D+_2, D−_2) 17b, respectively. The switch IC-D1 14a is connected to the USB device 1 3a via the power source line +5U_1 18a. The switch IC-D2 14b is connected to the USB device 2 3b via the power source line +5U_2 18b.

(Voltage Conversion Section 2)

Figure 2:
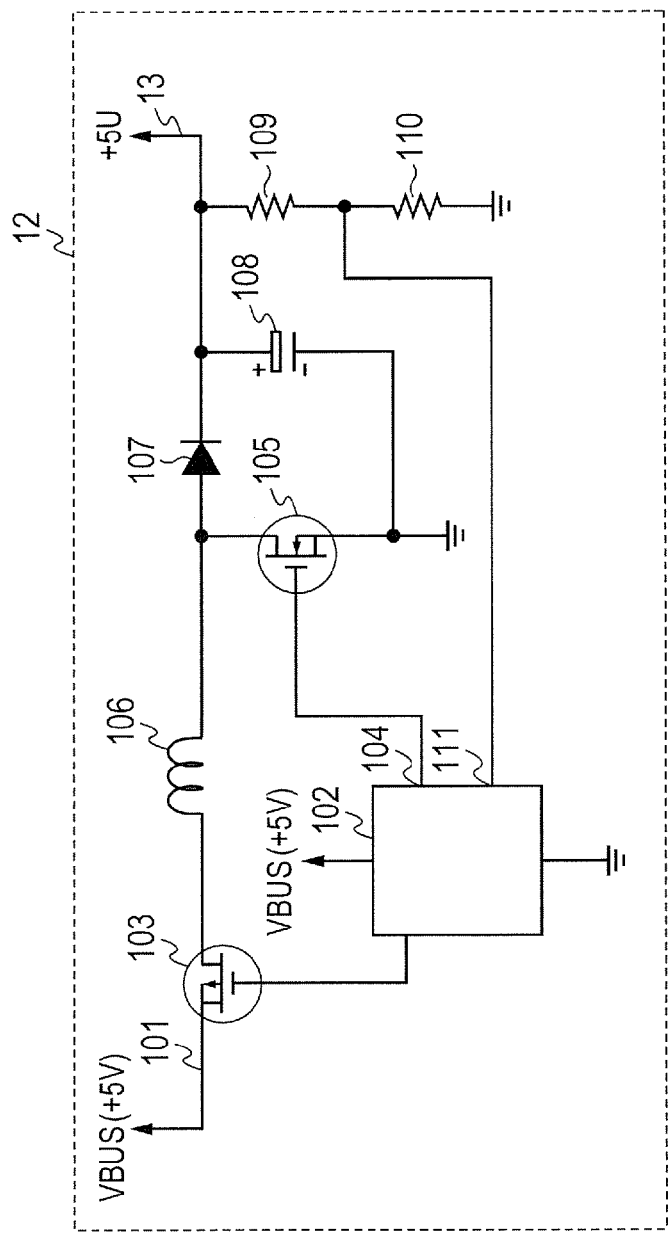
FIG. 2 illustrates a configuration of a voltage conversion section 2.

Here, a typical example of a configuration of the voltage conversion section 2 12 will be described. FIG. 2 is a schematic circuit diagram thereof. The voltage conversion section 2 12 includes an input power source line 101 for supplying the USB hub device 2, a universal control IC 102, and a load switch FET 103. The universal control IC 102 sets the gate of the load switch FET 103 to a low side, thereby conducting the source and the drain of the load switch FET 103. The voltage conversion section 2 12 further includes a switching FET 105, an inductor 106, a Schottky barrier diode (hereinafter called SBD) 107, an electrolytic capacitor 108 and resistors 109 and 110. The universal control IC 102 includes a feedback terminal 111, and a control terminal 104 for turning on/off the switching FET 105.

Since the source voltage supplied to the downstream USB device 3 is +5 V, the input power source line 101 is typically a +5 V source voltage line. In the case of a long wiring path from the USB host controller device 1 to the USB hub device 2, it is assumed that for instance the voltage of the input power source is reduced to about +4.5 V owing to the effects of the wiring impedance and the consumption current. In such a case, it is required that the voltage conversion section 2 12 converts the voltage to thereby adjust the voltage to be in a voltage range (+4.75 to +5.25 V) specified by the USB standard.

The universal control IC 102 of the voltage conversion section 2 12 internally includes a pulse width modulation circuit, and turns on the control terminal 104 for a duty time of a pulse width t with reference to a prescribed cycle T (PWM output) based on a result of comparison of difference so as to cause the voltage of the feedback terminal 111 to be constant. The control terminal 104 is connected to the gate of the switching FET 105, and the switching FET 105 is on while the control terminal 104 is on. While the switching FET 105 is on, the inductor 106 stores energy by electrification. When the switching FET 105 is turned off, a counter electromotive force is caused across the ends of the inductor 106, and a boosted voltage, where the counter electromotive force is added, and the load current are rectified and smoothed by the SBD 107 and the electrolytic capacitor 108 and output to the input power source line 101. Provided that the feedback terminal 111 of the universal control IC 102 is the reference voltage Vr, the resistance value of the resistor 109 is R109, and the resistance value of the resistor 110 is R110, the output voltage 13 (+5U) is defined according to the relationship of +5U=Vr×(R109+R110)/R110. It is desirable that +5U be adjusted to about +5.1 to +5.2 V in consideration of the amount of downstream voltage drop.

When the output voltage is reduced owing to an excessive load applied to an output terminal and the condition becomes uncontrollable even if the pulse width t is on for the maximum duty time, the universal control IC 102 stops the PWM output for protection against overload and switching of the switching FET 105 is stopped. However, the voltage conversion section 2 12 described in this embodiment is a boost DC/DC converter, and the input power source is output as it is to the output terminal via the SBD 107 even if switching of the switching FET 105 is stopped by overload protection. Thus, the universal control IC 102 has a function of interrupting the load switch FET 103 when the overload protection functions, and interrupts the supply of the power by opening (turning off) the gate of the load switch FET 103.

(Example of Typical USB Communication Operation)

Figure 3A:
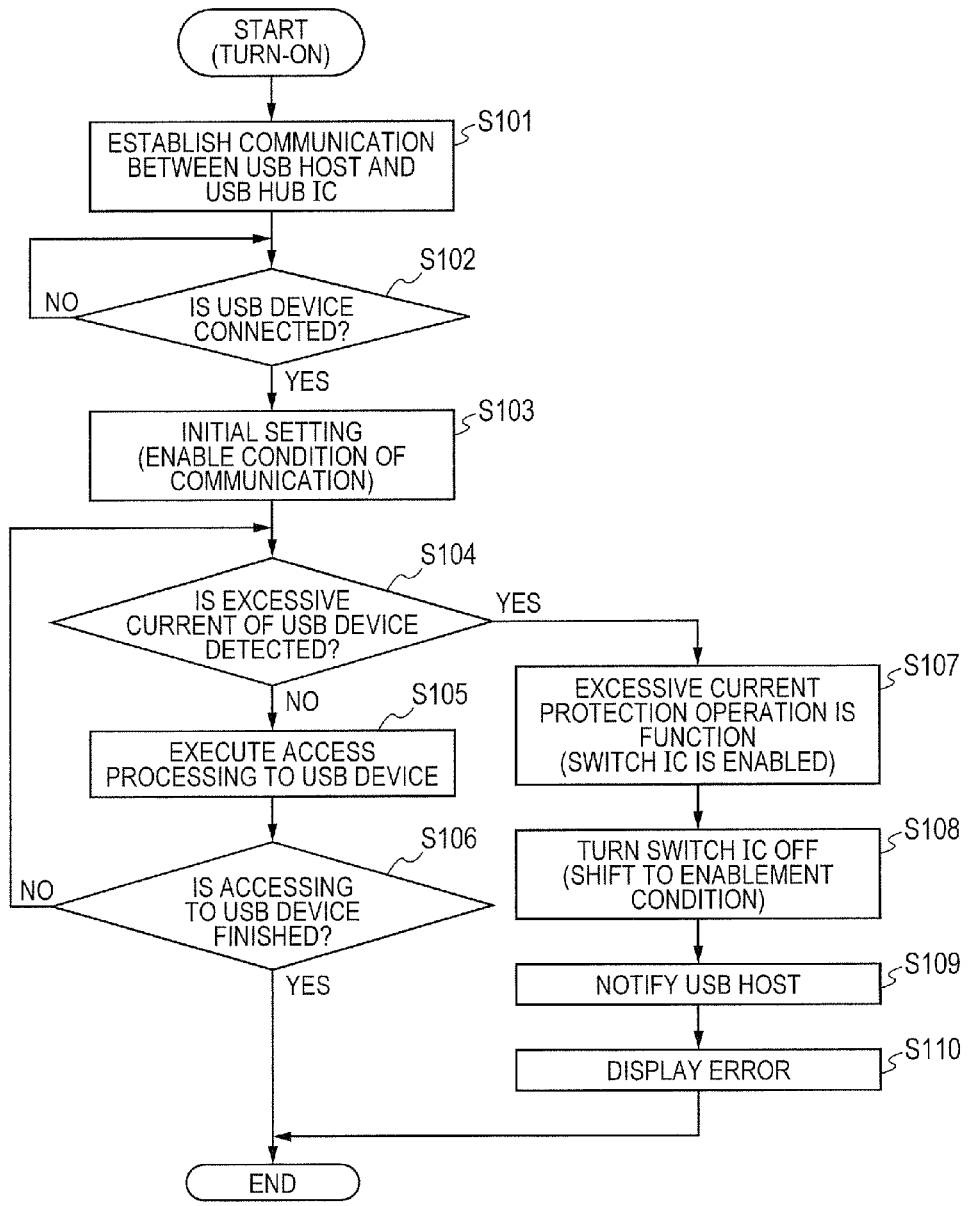
FIG. 3A illustrates a flowchart exemplifying a typical USB communication operation in Embodiment 1.

As to the USB communication, description will be made, assuming the high speed specification based on the USB 2.0 standard. The detailed description on the USB communication scheme is omitted because the USB 2.0 standard is publicly disclosed. An overview of operation of the USB host controller device 1 to the USB hub IC 9 to the USB device 3 is described with reference to the block diagram of FIG. 1 and a flowchart of FIG. 3A. In the flowchart of FIG. 3A, when the power of the USB host 4 is turned on, the USB host 4 activates an enable signal via the root hub 5, thereby turning on the switch IC-U 6 and causing the VBUS (+5 V) power source line 7 to be in a suppliable state condition. When the power is supplied, the USB host 4 determines whether or not the USB hub device is connected to the downstream of the USB host 4 according to conditions of an internal pull-up resistor of the data line of the USB host 4 and an internal pull-down resistor of the data line of the USB hub IC 9. In the USB communication, the internal pull-up resistor is connected by the USB host 4 to a minus data line D− in the case of a low speed and to a plus data line D+ in the case of a full speed, and the communication mode is determined. In the case of the high speed, after connection of the USB hub device 2 in the full speed mode has once been recognized, it is determined whether communication at the high speed can be performed according to communication verification (e.g. chirp-handshake). The communication verification of the USB hub device 2 and the USB device 3, and a method of verifying a USB communication mode are also performed between the USB hub devices 2 and USB device 3 according to analogous processes.

When the power is turned on, in step (hereinafter called "S") 101, communication between the USB host 4 and the USB hub IC 9 is established. In S102, the USB hub IC 9 determines whether the USB device 3 is connected or not, and waits until communication is established. In this case, the USB hub IC 9 outputs an enable signal from the enable terminal 15 to turn on the switch IC-D 14, and holds a condition capable of supplying a source voltage of +5U generated by the voltage conversion section 2 12, so as to allow recognizing that the USB device 3 is connected. In S102, if the USB hub IC 9 determines that the USB device 3 is connected, in S103 the USB hub IC 9 performs initial setting that is recognition of the USB device and verification of the USB communication mode with the USB device 3, and the condition becomes that capable of communication. In S104, the switch IC-D 14 determines whether the USB device 3 operates within a rated current of 500 mA specified according to the self power, that is, whether overcurrent was detected or not. In the case within the rated current of 500 mA, the processing proceeds to S105 and the USB hub device 2 performs access processing to the USB device 3 as a normal operation. In S106, the USB hub device 2 determines whether access to the USB device 3 is finished or not. In S106, in the case where the USB hub device 2 determines that access to the USB device 3 is finished, the processing is finished. In the case of determining that access to the USB device 3 is not finished, the processing returns to S104. In the case of removing the USB device 3, a completion operation is performed on a panel of a PC to thereby perform a process of terminating communication, so as not to corrupt data owing to removal of the USB device 3 by a user in communication.

Next, in S104, if the switch IC-D 14 determines that the USB device 3 detects overcurrent exceeding the rated current of 500 mA specified according to the self power, the processing proceeds to S107 and an overcurrent protection operation of the switch IC-D 14 in the downstream functions. Typically, in many cases, the overcurrent setting value pertaining to the overcurrent protection operation of the switch IC-D 14 is set to a value a little higher than 500 mA, for instance, around 750 mA to 1 A. If the overcurrent protection operation of the switch IC-D 14 functions, the switch IC-D 14 outputs, to the USB hub IC 9, a signal reversing the logic of the overcurrent detection terminal 16. In response to switching of the signal of the overcurrent detection terminal 16, in S108 the USB hub IC 9 reversely outputs the logic of the enable terminal 15 to turn off the switch IC-D 14 (ENABLE operation) so as not to continue supplying a source voltage of +5U to the USB device 3 in the abnormal condition. After releasing of the abnormal condition, such as removal of the USB device 3, and the signal of the overcurrent detection terminal 16 from the switch IC-D 14 is returned to a normal logic, the USB hub IC 9 actively operates the enable terminal 15 to turn on the switch IC-D 14. As a result, the condition becomes that capable of supplying the downstream with the source voltage of +5U.

In S109, if the USB hub IC 9 recognizes that the downstream USB device 3 is in the overcurrent condition, the USB device 3 notifies the USB host 4 of the overcurrent condition through upstream USB communication. In S110, in response to the notification from the USB hub IC 9, the USB host 4 causes a panel of a PC to display an error display indicating that the port to which the USB device 3 is connected is in the overcurrent condition and finishes the processing. The series of operations are also performed on the plurality of USB devices 3 connected to the downstream of the USB hub IC 9 in an analogous manner.

(Condition of Each Terminal and Recovery Method in the Case of Stopping Due to Overcurrent Protection Operation)

A table of FIG. 3B illustrates the condition of each terminal and a recovery method in the case where overcurrent passes through one USB device 3 and the switch IC-D 14 is stopped by an overcurrent protection operation, and the case where overcurrent passes through the whole of downstream and the voltage conversion section 2 12 is latched and stopped. The table of FIG. 3B illustrates how the protection function and the detection terminals behave for each point where the overload condition occurs (the USB device 1 3a, USB device 2 3b, and whole of downstream). The detection terminals in this case are the switch IC-D1 14a, the switch IC-D2 14b, the voltage conversion section 2 12, the overcurrent detection terminal 1 16a and the overcurrent detection terminal 2 16b. In the table of FIG. 3B, columns with dashes imply normal operation conditions.

In the table of FIG. 3B, when the USB device 1 3a is in the overload condition, the protection operation of the switch IC-D1 14a functions and turns off the VBUS source voltage (+5U__1) (indicated as "OFF" in the drawing). The overcurrent detection terminal 1 16a of the switch IC-D1 14a notifies the USB hub IC 9 of the functioning of the protection operation (indicated as "NOTIFICATION OF PROTECTION OPERATION" in the drawing). The other switch IC-D2 14b, the overcurrent detection terminal 2 16b and the voltage conversion section 2 12 do not stop but continue normal operations. A recovery method of the system when the USB device 1 3a is in the overload condition is performed by resetting by the USB host 4 (off and on operation of the switch IC-U 6 in the USB host 4) or insertion and removal of the USB device 1 3a. Likewise, when the USB device 2 3b is in the overload condition, the protection operation of the switch IC-D2 14b functions and turns off the VBUS source voltage (+5U__2). The overcurrent detection terminal 2 16b of the switch IC-D2 14b notifies the USB hub IC 9 of the functioning of the protection operation (indicated as "NOTIFICATION OF PROTECTION OPERATION" in the drawing). The other switch IC-D1 14a, the overcurrent detection terminal 1 16a, and voltage conversion section 2 12 do not stop but continue the normal operation. Likewise, the recovery method of the system is performed by resetting from the USB host 4 (off and on operation of the switch IC-U 6 in the USB host 1) or insertion and removal of the USB device 3b.

When the whole of downstream is in the overload condition, the protection operation of the voltage conversion section 2 12 functions and turns off the VBUS source voltage of +5U. At this time, the logic of the overcurrent detection terminal 1 16a and the overcurrent detection terminal 2 16b viewed from the USB hub IC 9 is not different from the logic in the normal operation. The voltage conversion section 2 12 itself also turns off the load switch FET 103 for being latched and stopped. In this case, since the voltage conversion section 2 12 is stopped, the switch IC-D1 14a and the switch IC-D2 14b turn off the IC itself (indicated as IC-OFF in the drawing). The recovery method of the system in the case where the whole of the downstream is in the overload condition requires an off and on operation of the power supply of the entire system, and automatic recovery cannot be performed.

(USB Hub Device System)

Figure 4:
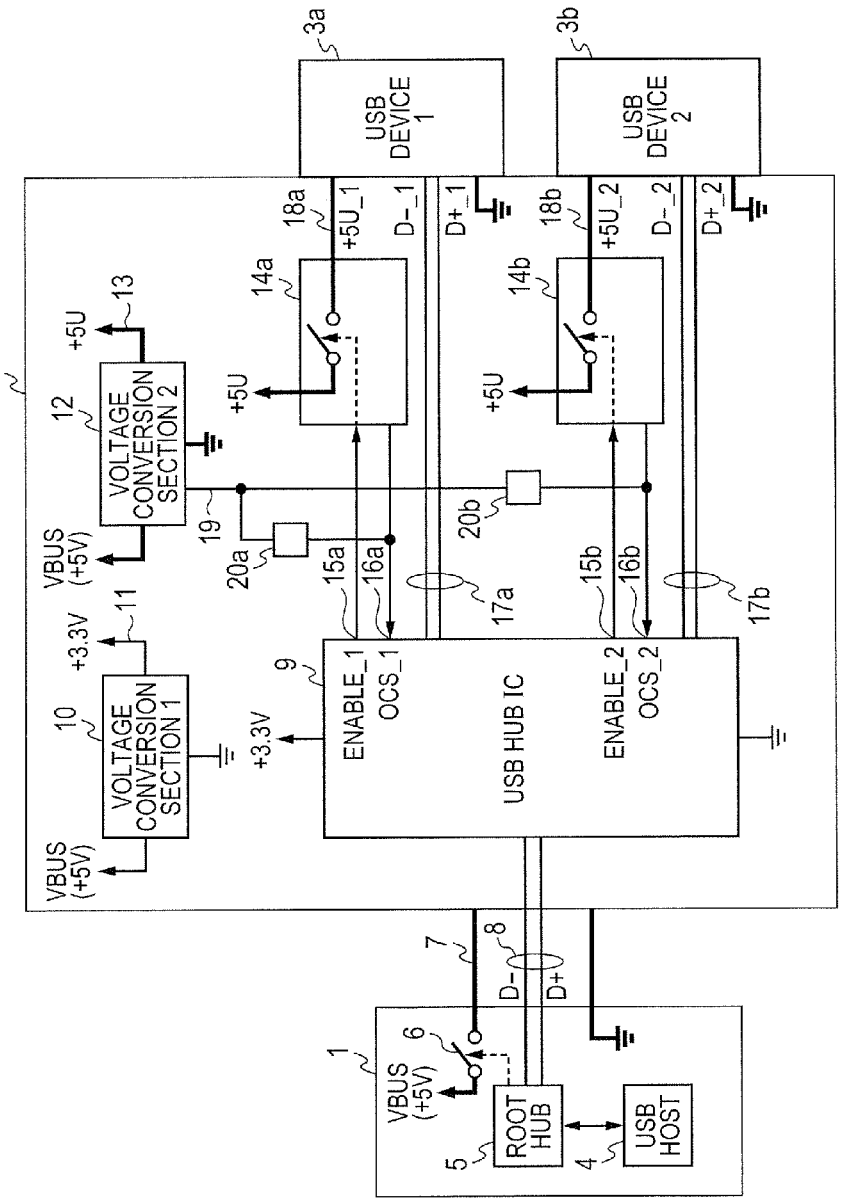
FIG. 4 illustrates a block diagram of a system configuration using a USB hub device in Embodiment 1.

FIG. 4 illustrates a block diagram of a system configuration using the USB hub device of this embodiment. As described above, this USB hub device 2 transmits and receives data to and from the USB host controller device 1 and the USB device 3 through USB communication. The description on the symbols having already been described is omitted. In this embodiment, the description is made assuming that two USB devices 3 are connected downstream. In FIG. 4, the control terminal 19 is a terminal for turning off the switch IC-D 14 by protection operation when the voltage conversion section 2 12 is in the overload condition. A signal output from the control terminal 19 is an overload protection signal LSW. Drivers 20a and 20b are wired-OR connected drivers for activating the overcurrent detection terminal 1 16a and the overcurrent detection terminal 2 16b by the overload protection signal LSW.

Figure 5A:
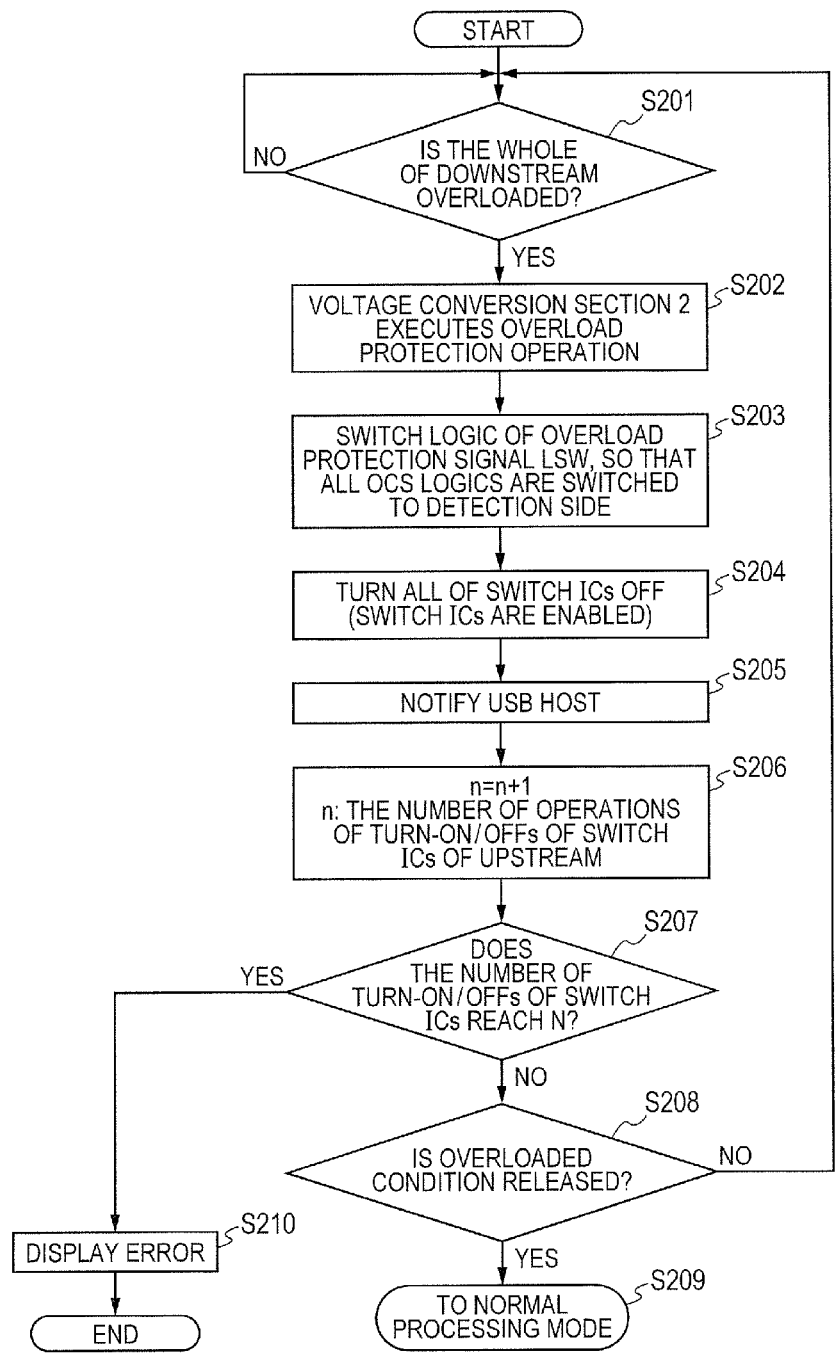
FIG. 5A illustrates a flowchart illustrating a process when the system in Embodiment 1 is abnormally stopped.

In the USB hub device 2 of this embodiment, when any one of one or more USB devices 3 (3a, 3b, . . . ) connected downstream is in the overload condition, protection against overcurrent by the switch IC-D 14 functions. However, in the case where the plurality of USB devices 3 (3a, 3b, . . . ) are connected and in a condition where each USB device 3 uses up to the rated current, any one of the USB devices 3 sometimes is in the overload condition, that is, the whole of the downstream sometimes is in the overload condition. In this case, the protection against overcurrent of the switch IC-D 14 does not necessarily functions previously, and the function of the overload protection of the upstream voltage conversion section 2 12 sometimes functions instead. FIG. 5A illustrates a flowchart of an abnormal processing mode in the case where the overload protection operation of the voltage conversion section 2 12 functions before the protection against overcurrent operation by the switch IC-D 14.

(Flowchart in Abnormal Processing Mode)

Referring to FIG. 5A, in S201, a control IC 102 of the voltage conversion section 2 12 determines whether the whole of downstream of the USB device 3 is in the overload condition or not. In S201, if the control IC 102 of the voltage conversion section 2 12 determines that the whole of downstream of the USB device 3 is in the overload condition, in S202 the voltage conversion section 2 12 performs the overload protection operation. That is, the voltage conversion section 2 12 turns off the load switch FET 103 (protector against abnormality) to interrupt power supply. In S203, when the control IC 102 of the voltage conversion section 2 12 turns off the load switch FET 103, the logic of the overload protection signal LSW is switched. The overload protection signal LSW is wired-OR connected to every overcurrent detection terminal 16 of the USB hub device 2. According to switching of the logic of the overload protection signal LSW, the logic of every overcurrent detection terminal 16 is switched to a side of detecting occurrence of overcurrent. After every overcurrent detection terminal 16 is switched to the overcurrent detection condition, in S204 the USB hub IC 9 reversely outputs the logic of the enable terminal 15 of every corresponding switch IC-D 14 to thereby turn off every switch IC-D 14 (operation to ENABLE condition).

In S205, the USB hub IC 9 sequentially notifies the USB host 4 that two or more USB devices 3 are in the overcurrent condition, through upstream USB communication. It is preprogrammed such that, when the USB host 4 sequentially receives notification that all the USB devices 3 are in the overcurrent condition from the USB hub IC 9 in a prescribed time period, this notification is recognized that the voltage conversion section 2 12 in the USB hub device 2 is stopped and protected. When the voltage conversion section 2 12 is stopped and protected, recovery is typically performed by turning off and on the input power source. Accordingly, when notification that all the USB devices are in the overcurrent condition is sequentially received from the USB hub IC 9, in S206 the USB host 4 performs an off and on operation on the upstream switch IC-U 6 to recover the voltage conversion section 2 12. Furthermore, the USB host 4 increments and stores the count value n of the off and on operation. It is provided that the count value n is n=0 immediately after the start of this flowchart. Although the voltage conversion section 2 12 is recovered by the off and on operation on the switch IC-U 6, the voltage conversion section 2 12 would be stopped and protected again without release of the downstream overload factor. Accordingly, in S207, the USB host 4 determines whether the number of off and on times of the switch IC-U 6 reaches N (N is any natural number) or not. If the USB host 4 determines that the number does not reach N in S207, this host determines whether the downstream overload condition is released or not in S208. If the USB host 4 determines that the downstream overload condition is not released in S208, the processing returns to S201. Verification of whether the downstream overload condition is released or not in S208 is determined by the USB host 4 according to whether the USB hub IC 9 has notified that all the USB devices are in the overcurrent condition or not. If the overload condition is released and the voltage conversion section 2 12 recovers in S208, the mode comes out of the abnormal processing mode in S209 and transitions to the normal processing mode. When the number of off and on times of the switch IC-U 6 reaches N in S207, the processing proceeds to S210, an error display indicating that the overload device is connected downstream or that there is possibility that the USB hub device 2 12 may be broken is displayed on the panel of the PC and the processing is finished.

(Condition of Each Terminal and Recovery Method in Protection Operation)

Here, FIG. 5B illustrates a case where overcurrent flows into one USB device 3 and the switch IC-D 14 connected upstream is stopped by an overcurrent protection operation, as in pattern 1. FIG. 5B further illustrates a case where current at least the rated current flows through one or more USB device 3, the protection against overcurrent of the switch IC-D 14 does not function, the load current of the whole of downstream exceeds allowable current of the voltage conversion section 2 12, and the voltage conversion section 2 12 is stopped and protected, as in pattern 2. FIG. 5B illustrates conditions of the protection function and the detection terminal for each point where the overload condition occurs (the USB device 1 3a, USB device 2 3b and whole of downstream). The detection terminals in this case are the switch IC-D1 14a, the switch IC-D2 14b, the voltage conversion section 2 12, the overcurrent detection terminal 1 16a and the overcurrent detection terminal 2 16b. In the table of FIG. 5B, columns with dashes imply normal operation conditions.

Since the pattern 1 is analogous to that described above, the description thereof is omitted. In the pattern 2, when the voltage conversion section 2 12 is stopped, the load switch FET 103 is turned off to thereby reverse the logic of the overcurrent detection terminal 1 16a and the overcurrent detection terminal 2 16b to the side of detecting occurrence of the overcurrent according to a trigger that is switching of the logic of the overload protection signal LSW. Accordingly, the USB hub IC 9 recognizes that the protection against overcurrent of the USB device 1 3a and the USB device 2 3b functions. That is, an overcurrent detection signal is output from the overcurrent detection terminal 1 16a and the overcurrent detection terminal 2 16b to the USB hub IC 9 and the condition becomes the same condition as that subjected to the notification of protection operation. Since the USB host 4 can recognize the stoppage of the voltage conversion section 2 12, the recovery method of the system in the pattern 2 is performed by resetting from the USB host 4 (off and on operation on the switch IC-U 6, and restart) and automatic recovery can be performed.

As described above, the USB hub device of this embodiment can notify the USB host that the voltage conversion section 2 12 for supplying the downstream USB device 3 with the source voltage is stopped and protected when the condition is the abnormal condition, such as overload and a failure condition. Accordingly, the USB host can perform processes for automatic recovery. Since notification can be issued via the USB communication, it is not required to newly provide a signal line for detecting an error, and an inexpensive interface configuration is sufficient for realization.

In this embodiment, the description has been made assuming that the number of USB devices connected downstream is two. Even in the case where three or more USB devices are connected or one USB device is connected, the operation of this embodiment of the present invention is applicable and can exert analogous advantageous effects.

This embodiment has described that a source of supplying a source voltage to the USB hub device is the USB host controller. Instead, a configuration of supplying from a power source device external from the USB host controller and the USB hub device can also perform recovery control after taking measures against an error from the USB host controller on the external power source device, thereby allowing analogous advantageous effects to be exerted. Adoption of a power source device external from the USB host controller and the USB hub device as the source of supplying a source voltage to the USB hub device is also applicable to following embodiments.

According to this embodiment, even when the self power voltage conversion section of the USB hub device is stopped by a protection function operation, the USB host correctly recognizes the error condition using the existing interface configuration to thereby allow the automatic recovery of the system using the USB hub device to be processed.

Embodiment 2

Figure 6A:
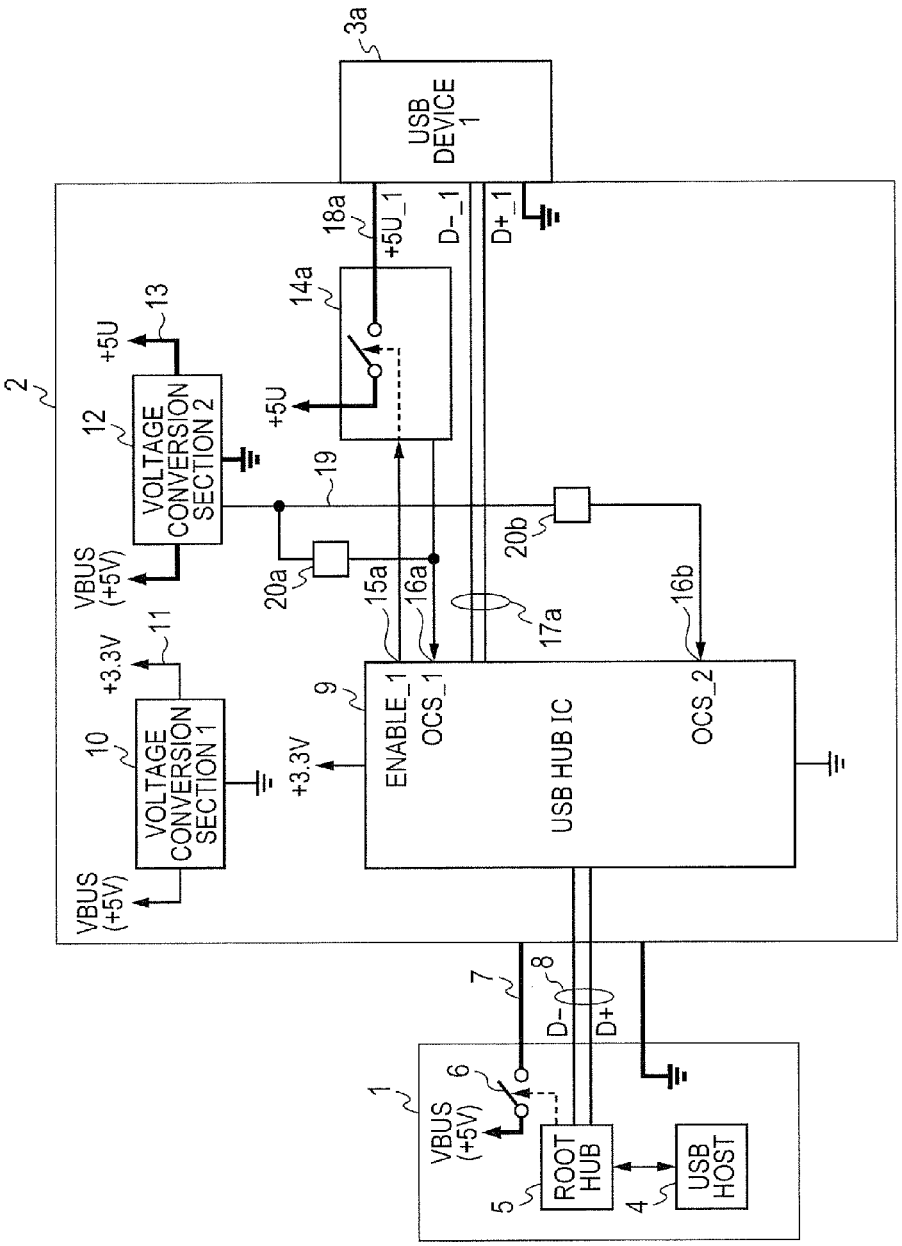
FIG. 6A illustrates a block diagram of a system configuration using a USB hub device in Embodiment 2.

FIG. 6A illustrates a block diagram illustrating a system configuration of a USB hub device of this embodiment. FIG. 6A illustrates a condition where one USB device 1 3a is connected to a USB hub IC 9 including a plurality of downstream ports. The symbols of the respective blocks in FIG. 6A have already been described in Embodiment 1. Accordingly, the description thereof is omitted. The operation in the abnormal processing mode of this embodiment can be described as with the flowchart of Embodiment 1 (FIG. 5A).

Here, FIG. 6B illustrates a case where overcurrent flows into one USB device 13a and the switch IC-D1 14a connected upstream is stopped by an overcurrent protection operation, as in pattern 1. FIG. 6B further illustrates a case where, when overcurrent flows into the USB device 1 3a, the protection against overcurrent of the switch IC-D1 14a does not function and the voltage conversion section 2 12 is stopped by a protection function or a case where the load immediately below the voltage conversion section 2 12 becomes excessive and is stopped and protected, as in pattern 2. In the table of FIG. 6B, columns with dashes imply normal operation conditions.

FIG. 6B illustrates how the protection functions and detection terminals operate for each point where the overload condition occurs (the USB device 3a, the voltage conversion section 2 12) and the recovery method. The detection terminals in this case are the switch IC-D1 14a, the voltage conversion section 2 12, the overcurrent detection terminal 1 16a, and the overcurrent detection terminal 2 16b. The pattern 1 in this embodiment is analogous to that in Embodiment 1. Accordingly, the description thereof is omitted. In the pattern 2, when the voltage conversion section 2 12 is stopped, the logic of the overload protection signal LSW is switched to turn off the load switch FET 103, thereby reversing the logic of the overcurrent detection terminal 1 16a and the overcurrent detection terminal 2 16*b* to the side of detecting occurrence of overcurrent. That is, an overcurrent detection signal is output from the overcurrent detection terminal 1 16*a* and the overcurrent detection terminal 2 16*b* to the USB hub IC 9, and the condition becomes the same condition as that subjected to the notification of protection operation. Even when the USB device 2 3*b* is in a condition without connection, the USB host 4 can recognize that the voltage conversion section 2 12 has been stopped and protected by causing two or more overcurrent detection terminals to be in the overcurrent condition.

The USB host 4 can recognize that the voltage conversion section 2 12 is stopped. Accordingly, the recovery method of the system when the voltage conversion section 2 12 is in the overload condition is performed by resetting from the USB host 4 (off and on operation on the switch IC-U 6) as with Embodiment 1, allowing automatic recovery.

According to this embodiment, even when the self power voltage conversion section of the USB hub device is stopped by a protection function operation, the USB host correctly recognizes an error condition using the existing interface configuration, thereby allowing automatic recovery of the system using the USB hub device to be processed.

Embodiment 3

Figure 7:
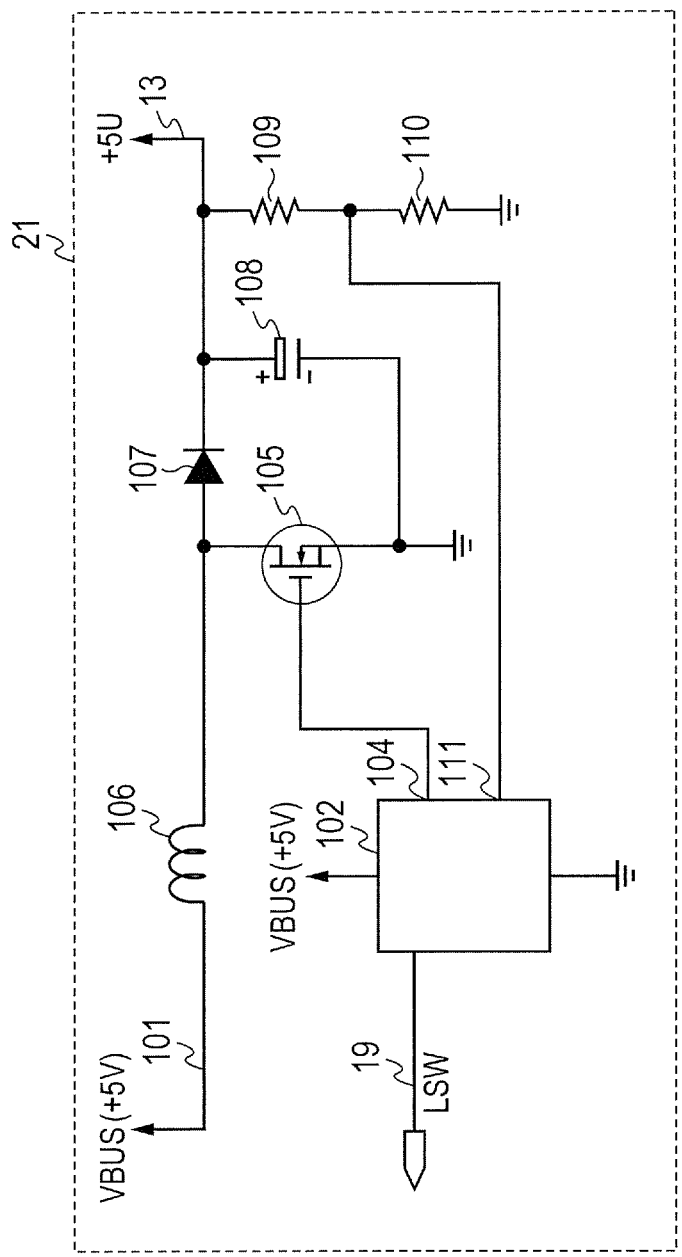
FIG. 7 is a schematic circuit diagram of a boost DC/DC converter in Embodiment 3.

FIG. 7 is a circuit diagram of a voltage conversion section 3 21 in a system using a USB hub device in this embodiment. FIG. 7 illustrates the voltage conversion section 2 12 described in FIG. 2 where the load switch FET 103 and the control signal line are removed. When the overload protection functions in the voltage conversion section 3 21, the logic of the overload protection signal LSW is switched. The configuration of the USB hub device 2 of this embodiment is analogous to that in FIG. 4 except that the voltage conversion section 2 12 is replaced with the voltage conversion section 3 21. The operation processing of this embodiment can be described based on the flowchart of FIG. 5A.

In the flowchart of FIG. 5A, when the downstream USB device 3 is in the overload condition, the overload protection for the voltage conversion section 3 21 analogously functions also in this embodiment. However, the voltage conversion section 3 21 of this embodiment does not include the load switch FET 103, and, when the overload protection functions, the logic of the overload protection signal LSW is immediately switched; this point is different from the case of Embodiment 1. According to the switching of the logic of the overload protection signal LSW, the logic of every overcurrent detection terminal 16 is switched to the side of detecting occurrence of overcurrent.

As described above, in this embodiment, when the voltage conversion section 3 21 is in the overload condition such as the state of being stopped and protected, every downstream switch IC-D is turned off to thereby interrupt the entire power supply. As a result, a configuration without the load switch FET in the voltage conversion section 3 21 can be selected and adopted, which exerts an advantageous effect of reducing the cost.

As with above Embodiment 1 and 2, according to the USB hub device of this embodiment, when the voltage conversion section 3 21 for supplying the downstream USB device with the source voltage is in the abnormal condition, such as overload and failure, notification of being stopped and protected can be issued to the USB host. Thus, the USB host can perform processes for automatic recovery. Furthermore, since notification can be issued via USB communication, it is not required to newly provide a signal line for error detection, and an inexpensive interface configuration is sufficient for realization.

In this embodiment, the description has been made assuming that the number of USB devices connected downstream is two. Even in the case where three or more USB devices are connected or the case where one USB device is connected instead, analogous advantageous effects can be exerted.

According to this embodiment, even when the self power voltage conversion section of the USB hub device is stopped by a protection function operation, the USB host correctly recognizes the error condition using the existing interface configuration, thereby allowing automatic recovery of the system using the USB hub device to be processed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-252467, filed Nov. 18, 2011, which is hereby incorporated by reference herein in its entirety.

What is claimed is:

1. A hub device for communicating with a USB host controller and a USB device to transmit and receive data through USB, comprising:
   a USB hub IC including a plurality of downstream ports;
   a voltage converter that converts a source voltage supplied to the hub device into a source voltage to be supplied to a plurality of USB devices connected to the plurality of downstream ports; and
   a plurality of switch units that interrupt the source voltage supplied by the voltage converter to the plurality of USB devices, and output an overcurrent detection signal when overcurrent flows into the plurality of USB devices, wherein
   the USB hub IC comprises a plurality of overcurrent detection terminals into which the overcurrent detection signal from the plurality of switch units is input, and a signal notifying an abnormal condition of the voltage converter that causes the plurality of overcurrent detection terminals of the USB hub IC to be in an overcurrent detection condition, and wherein
   in a condition where the source voltage from the voltage converter to the plurality of USB devices is continued, in an overcurrent state in which overcurrent flows into at least one of the plurality of USB devices, a switch unit corresponding to the one of the plurality of USB devices in the plurality of switch units interrupts the source voltage supplied by the voltage converter to the one of the plurality of USB devices, and the USB hub IC receives an overcurrent detection signal corresponding to the one of the plurality of USB devices, and
   in an abnormal state in which the source voltage supplied by the voltage converter to the plurality of USB devices is interrupted, the USB hub IC receives plural overcurrent detection signals corresponding to the plurality of USB devices.

2. A hub device according to claim 1, wherein the abnormal condition includes an abnormal condition where an entire load current of the plurality of USB devices exceeds an allowable current, and
   the USB hub IC causes all of the plurality of overcurrent detection terminals of the USB hub IC to be in the overcurrent detection condition by the signal notifying the abnormal condition transmitted from the voltage converter.

3. A hub device according to claim 2, wherein the source voltage supplied to the hub device includes one of a source voltage supplied by the USB host controller and a source voltage supplied by an external power source device.

4. A hub device according to claim 1, wherein the voltage converter comprises a protector,
the abnormal condition includes an abnormal condition in which the source voltage is incapable of supplying to either one or more USB device, and
in the abnormal condition in which the source voltage is incapable of supplying to either one or more USB device, the protector stops supply of the source voltage, and outputs the signal notifying the abnormal condition.

5. A hub device according to claim 4, wherein the abnormal condition is either one of conditions where:
an entire downstream is in an overcurrent condition;
a condition where the overcurrent detection terminals of the USB hub IC that correspond to two or more ports among the plurality of downstream ports are in the overcurrent detection condition; or
a condition where the voltage converter is in a failure condition.

6. A hub device according to claim 4, wherein the protector includes a load switch that interrupts the source voltage supplied to the hub device.

7. A system circuit, comprising:
a USB host controller;
a USB device; and
a hub device according to claim 4, wherein
after the protector functions, the USB host controller restarts a power source device supplying the source voltage to be supplied to the hub device.

8. A hub device for communicating with a USB host controller and a USB device to transmit and receive data through USB, comprising:
a USB hub IC including a downstream port;
a voltage converter that converts a source voltage supplied to the hub device into a source voltage to be supplied to a USB device connected to the downstream port; and
a switch unit that interrupt the source voltage supplied by the voltage converter to the USB device, and output an overcurrent detection signal when overcurrent flows into the USB device, wherein
in a condition where the source voltage from the voltage converter to the USB device is continued, in an overcurrent state in which overcurrent flows into the USB device, the switch unit interrupts the source voltage supplied by the voltage converter to the USB device and the USB hub IC receives an overcurrent detection signal corresponding to the USB device, and
in an abnormal state in which the source voltage supplied by the voltage converter to the USB device is interrupted, the USB hub IC receives plural overcurrent detection signals including the overcurrent detection corresponding to the USB device.

9. A hub device according to claim 8, wherein the source voltage supplied to the hub device includes one of a source voltage supplied by the USB host controller and a source voltage supplied by an external power source device.

10. A hub device according to claim 8, wherein the voltage converter includes a protection unit as a load switch configured to interrupt the source voltage supplied to the USB device.

11. A system circuit, comprising:
a USB host controller;
a USB device; and
a hub device according to claim 10, wherein
after the protector functions, the USB host controller restarts a power source device supplying the source voltage to be supplied to the hub device.

* * * * *